United States Patent
Engbersen et al.

(10) Patent No.: US 7,545,737 B2
(45) Date of Patent: Jun. 9, 2009

(54) METHOD FOR AUTOMATICALLY MANAGING A VIRTUAL OUTPUT QUEUING SYSTEM

(75) Inventors: Antonius Paulus Engbersen, Feusisberg (CH); Ronald Pete Luijten, Horgen (CH)

(73) Assignee: International Business Machines Corporation, Armonk, NY (US)

( * ) Notice: Subject to any disclaimer, the term of this patent is extended or adjusted under 35 U.S.C. 154(b) by 532 days.

(21) Appl. No.: 11/427,859

(22) Filed: Jun. 30, 2006

(65) Prior Publication Data

US 2008/0002572 A1    Jan. 3, 2008

(51) Int. Cl.
*H04J 1/16*   (2006.01)
*H04J 3/14*   (2006.01)
*H04L 1/00*   (2006.01)
*H04L 12/26*  (2006.01)
*H04L 12/56*  (2006.01)
*H04L 12/28*  (2006.01)

(52) U.S. Cl. .................. 370/217; 370/227; 370/248; 370/395.4

(58) Field of Classification Search ................ 370/217, 370/227, 248, 395.4
See application file for complete search history.

(56) References Cited

U.S. PATENT DOCUMENTS

| | | | |
|---|---|---|---|
| 6,625,121 B1* | 9/2003 | Lau et al. | 370/230 |
| 6,667,984 B1* | 12/2003 | Chao et al. | 370/414 |
| 7,058,010 B2* | 6/2006 | Chidambaran et al. | 370/218 |
| 2003/0048792 A1* | 3/2003 | Xu et al. | 370/400 |
| 2003/0126280 A1* | 7/2003 | Yao et al. | 709/234 |
| 2004/0013124 A1* | 1/2004 | Peebles et al. | 370/412 |
| 2004/0100980 A1* | 5/2004 | Jacobs et al. | 370/412 |
| 2007/0133585 A1* | 6/2007 | Minkenberg et al. | 370/420 |
| 2008/0304503 A1* | 12/2008 | Blake | 370/412 |

* cited by examiner

*Primary Examiner*—Chi H Pham
*Assistant Examiner*—Farah Faroul
(74) *Attorney, Agent, or Firm*—Michael J. Buchenhorner; Stephen C. Kaufman

(57) ABSTRACT

A method for automatically managing a virtual output queuing system in a switching fabric. The method includes detecting if a link is one of a non-operational-link and an operational-link. The link enables communication between a first-switching-unit and a second-switching-unit. If the link is the non-operational-link, the method further includes discarding at least one packet destined for the link. The discarding step further includes either dropping of the at least one packet or scheduling the at least one packet.

1 Claim, 6 Drawing Sheets

METHOD FOR AUTOMATICALLY MANAGING A VIRTUAL OUTPUT QUEUING SYSTEM

FIELD OF THE INVENTION

The present invention relates generally to queuing systems and more specifically, to automatically managing a virtual output queuing system in a switching fabric.

BACKGROUND OF THE INVENTION

Switching fabrics are generally a part of communication or networking systems organized to temporarily associate functional units, transmission channels or telecommunication circuits for the purpose of providing a desired telecommunication facility. A switching fabric can be used to interconnect boards. Switching fabrics provide high flexibility since multiple boards can communicate with each other simultaneously using switching fabrics. In networking and telecommunication systems, these boards are called line-cards. In computing applications, these boards are called adapters, blades or simply port-cards. A switching fabric can be a multi-stage switching fabric. A multi-stage switching fabric comprises a plurality of switching units that are connected to each other via physical links. Packets can be transferred from one switching-unit to another using a data link and flow control signals can be transferred using flow control links. Data links and control links form a part of the physical links.

Compute or network nodes in an interconnection network communicate by exchanging packets. Packets are generated from a source port and are queued in appropriate Virtual Output Queues (VoQs) of the switching units in the switching fabric so that the packets can be transmitted to their destined destination port via VoQs of some switching units. Each packet is destined for at least one destination port. A VoQ queues packets according to their destination ports.

However, if a destination port is not connected to a device, the VoQs dedicated to that destination port unnecessarily consume resources. Moreover, a path that a packet follows from a source port to that destination output port can get congested due to slow or no draining of the packets at the output of the fabric.

In some of the existing systems using Virtual Output Queues (VoQs) or next-stage VoQs in switching fabrics, a switching-unit sorts a plurality of packets in VoQs according to the output ports in the next switching units. This means that the VoQ arrangement in a switching-unit needs to be configured based on an actual topology of the next switching units. This requires a significant amount of configuration effort for even small size switching fabric.

SUMMARY OF THE INVENTION

An aspect of the invention is to provide a method and a system for automatically managing VoQs in a switching fabric.

In order to fulfill the above aspect, the method comprises detecting if a link is a non-operational-link or an operational-link. The method further comprises discarding at least one packet destined for the link if the link is a non-operational-link. The discarding step can comprise dropping the packet or scheduling the packet for transmission.

Discarding the packets that are destined for the non-operational-link ensures that there is no clogging due to accumulated packets and that the resources are conserved. Once the non-operational-link becomes an operational-link, new packets destined for the link and the packets that are scheduled to be transmitted later, can be sent in the usual manner.

The present invention also proposes a system for automatically managing VoQs in a switching fabric. The system comprises a detecting module for detecting if a link, on which the packet has to be transmitted to a switching-unit, is an operational-link or a non-operational-link. If the link is an operational-link, a sending module sends the packet to the switching-unit. However, if the link is detected to be a non-operational-link, the packet is discarded by a discarding-module.

BRIEF DESCRIPTION OF THE DRAWINGS

The foregoing objects and advantages of the present invention for a method of automatically managing a virtual output queuing system in a switching fabric may be more readily understood by one skilled in the art with reference being had to the following detailed description of several preferred embodiments thereof, taken in conjunction with the accompanying drawings wherein like elements are designated by identical reference numerals throughout the several views, and in which.

DETAILED DESCRIPTION

Figure 1:
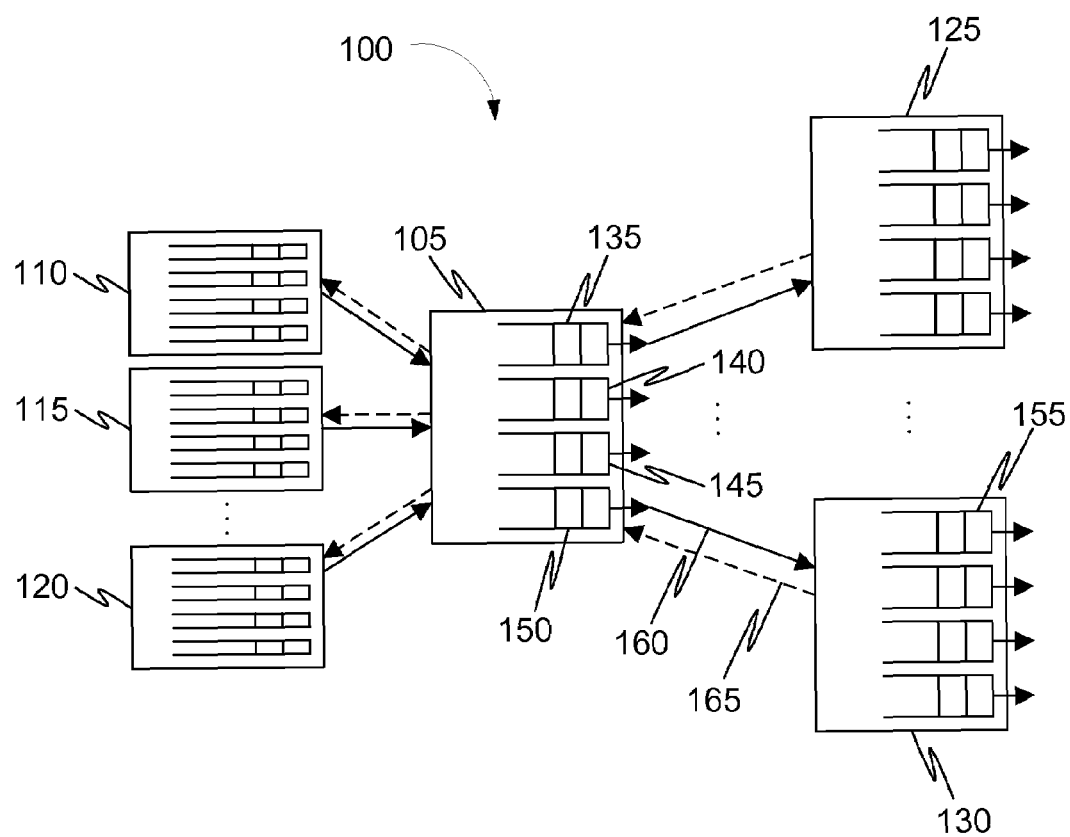
FIG. 1 illustrates a block diagram depicting an exemplary switching fabric in accordance with an embodiment of the present invention.

Before describing in detail embodiments that are in accordance with the present invention, it should be observed that the embodiments reside primarily in combinations of method steps and apparatus components related to a method and apparatus for automatically managing a virtual output queuing system in a switching fabric. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

In this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that embodiments of the invention described herein may be comprised of one or more conventional processors and unique stored program instructions that control the one or more processors to implement, in conjunction with certain non-processor circuits, some, most, or all of the functions of the method and apparatus for automatically managing the virtual output queuing system in the switching fabric. The non-processor circuits may include, but are not limited to, a radio receiver, a radio transmitter, signal drivers, clock circuits, power source circuits, and user input devices. As such, these functions may be interpreted as steps of a method for automatically managing the virtual output queuing system in the switching fabric. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Generally speaking, pursuant to the various embodiments, the present invention deals with achieving an automatic configuration of the switching fabric for minimizing packet congestion in the switching fabric.

Referring now to the drawings, and in particular FIG. 1, a block diagram depicting an exemplary switching fabric is shown in accordance with an embodiment of the present invention. A switching fabric 100 shown in the present embodiment can be a multi-stage switching fabric. However, the present invention can also be applicable to a single-stage switching fabric. Switching fabric 100 can comprise a plurality of switching-units, such as a switching-unit 105, a switching-unit 110, a switching-unit 115, a switching-unit 120, a switching-unit 125 and a switching-unit 130. Switching-unit 105 can be a next-stage for switching-unit 110, switching-unit 115 and switching-unit 120. Similarly, at least one of switching-unit 125 and switching-unit 130 can be the next-stage for switching-unit 105. Additionally, switching-unit 105 can be a previous stage for switching-unit 125 and switching-unit 130. Similarly, at least one of switching-unit 110, switching-unit 115 and switching-unit 120 can be the previous stage for switching-unit 105. Switching-unit 125 and switching-unit 130 can also be switching adapters or destination ports, herein referred to as switching-output-destination ports. Similarly, switching-unit 110, switching-unit 115 or switching-unit 120 can be switching adapters or source ports, herein referred to as switching-output-source ports. A switching-output-source port can be a port that a packet enters switching fabric 100 from and a switching-output-destination port can be a port that the packet is destined for. A path that the packet follows in switching fabric 100 from a switching-output-source port to a switching-output-destination port is herein referred to as a packet-transfer-path.

Switching fabric 100 can employ a next-stage virtual output queuing system. The previous stage can sort packets into a plurality of Virtual output Queues (VoQs) according to the number of VoQs in the next-stage. For example, switching-unit 105 can sort packets into a VoQ 135, a VoQ 140, a VoQ 145 and a VoQ 150 depending on the number of VoQs of switching-unit 130. In this example, switching-unit 105 is the previous stage for the switching-unit 130 and switching-unit 130 is the next-stage for the switching-unit 105. Sorting packets in a plurality of VoQs according to the number of VoQs in the next-stage can have significant performance advantages, such as conservation of resources.

However, those skilled in the art will realize that the number of VoQs in the next-stage that are active can be dependent on an actual configuration of switching fabric 100, for example if there is actually a device connected to a switching-output-destination port. One embodiment of the present invention facilitates determining the number of active switching-output-destination ports and enables in setting-up the required number of VoQs in the previous stage. For example, say a VoQ 155 in switching-unit 130 corresponds to a switching-output-destination port. If this switching-output-destination port is not connected to any device, a link connecting switching-unit 130 to the switching-output-destination port is detected to be a non-operational-link. A method of detecting a non-operational-link is described in detail in conjunction with FIG. 3. If VoQ 155 corresponds to the switching-output-destination port, packets from VoQ 155 can be discarded so as to avoid congestion. A method of discarding a packet is described in detail in conjunction with FIG. 4. In an embodiment of the present invention, discarding the packets in VoQ 155 can comprise either dropping the packets or scheduling the packets to be transmitted later.

Additionally, in the present embodiment, a link connecting switching-unit 105 and switching-unit 130 comprises a forward-link 160 and a return-path 165. Typically, packets are transmitted over a forward-link and flow control signals are transmitted over a return-path. For example, switching-unit 105 can transmit packets to switching-unit 130 over the forward-link 160. These packets can be destined for the switching-output-destination port that has no connected device. The packets can be stored a VoQ, say VoQ 155, which corresponds to the switching-output-destination port. When the link connecting VoQ 155 to the switching-output-destination port is detected to be non-operational, switching-unit 130 can discard packets destined for this non-operational-link. This can prevent packet congestion in switching-unit 130. Consequently, any packet destined for VoQ 155 in a previous stage, for instance switching-unit 105, may always be considered to move forward, and can never be a reason for congestion build-up.

Moreover, in an embodiment of the present invention, switching-unit 130 can inform switching-unit 105 about the non-operational-link over return-path 165. Switching-unit 105 can then discard packets that are destined for the non-operational-link so that the packets do not accumulate in the VoQs of switching-unit 105 and cause clogging.

Figure 2:
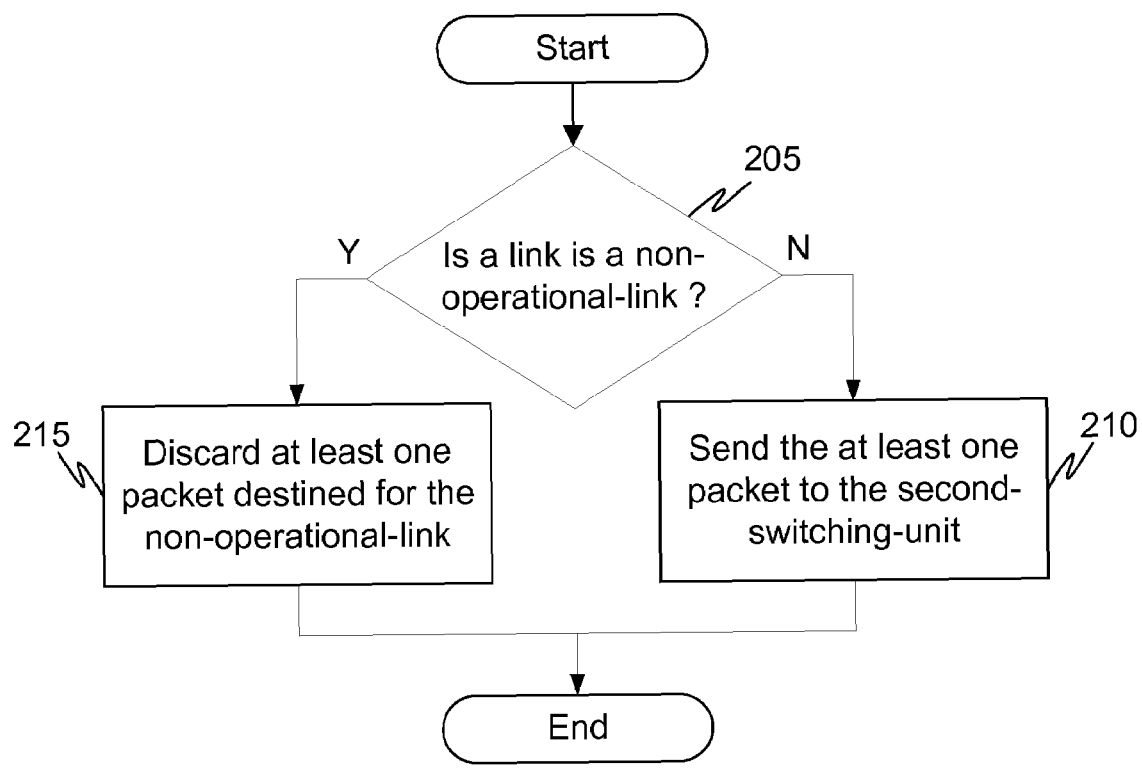
FIG. 2 illustrates a flow diagram for a method of managing a virtual output queuing system in a switching fabric in accordance with an embodiment of the present invention.

Turning now to FIG. 2, a flow diagram for a method of managing a virtual output queuing system in a switching fabric is shown in accordance with an embodiment of the present invention. The switching fabric can comprise at least one switching-unit. Some of the packets entering the switching fabric from a plurality of switching-output-source ports can pass through the switching-unit. The switching-unit is, therefore, a part of a packet-transfer-path. A packet-transfer-path is a path followed by a packet from its switching-output-source port to its switching-output-destination port. Typically, packets can be transmitted from a switching-unit to a next switching-unit in a forward direction and flow control signals can be received at the switching-unit from the next switching-unit in a backward direction. However, in an embodiment of the present invention, the packet-transfer-path can be a bi-directional packet-transfer-path. For example, packets can be sent from the switching-unit to a next-stage in the forward direction and packets can also be received at the switching-unit from the next-stage in the backward direction. The next-stage can be another switching-unit, a switch adapter or a switching-output-destination port. Those skilled in the art will realize that the switching-unit can be a part of a plurality of packet-transfer-paths corresponding to a plurality of switching-output-destination ports. Each packet passing through the switching fabric is destined for at least one of the switching-output-destination ports.

The method of FIG. 2 comprises detecting if a link is a non-operational-link or an operational-link, at step 205. A method for detecting a non-operational-link is described in detail in FIG. 3. The present invention allows the detecting step, step 205, to be completely automatic. Those skilled in the art will realize that the link can be a part of a plurality of packet-transfer-paths. Typically, the link enables communication between two switching-units. In the interest of clarity, the two switching-units will be herein referred to as a first-switching-unit and a second-switching-unit. The second-switching-unit is a next-stage for the first-switching-unit. The first-switching-unit can be a switch chip, a switch adapter or a switching-output-source port. Similarly, the second-switching-unit can be a switch chip, a switch adapter or a switching-output-destination port.

The link connecting the first-switching-unit and the second-switching-unit comprises a forward-link and a return-path. The forward-link enables the first-switching-unit to send packets to the second-switching-unit and the return-path enables the second-switching-unit to send flow control signals to the first-switching-unit. In an embodiment of the present invention, if the link is a part of a bi-directional packet-transfer-path, the link is a bi-directional link. The link can then comprise a forward-link and a return-path. For example the second-switching-unit can also send packets back to the first-switching-unit over the return-path.

If, at step 205, the link is detected to be an operational-link, one or more packets destined in the first-switching-unit can be sent to the second-switching-unit, at step 210, in the conventional manner. However, if, at step 205, the link is detected to be a non-operational-link, one or more packets destined for this non-operational-link is discarded at step 215. Thus, if the first-switching-unit detects that a link connecting the first-switching-unit to the second-switching-unit is non-operational, the first-switching-unit discards packets destined for the non-operational-link. Discarding the packets can comprise either dropping the packets or scheduling the packets for transmission at a later time, for instance when the non-operational-link becomes operational. Those skilled in the art will realize that dropping the packets can comprise deleting the packets from the VoQ and scheduling the packets can comprise placing the packets in a Retransmission Queue (RTR) so that the packets can be sent later when the link becomes an operational-link. A method for discarding a packet is described in detail in conjunction with FIG. 4.

In an embodiment of the present invention, the first-switching-unit informs a previous-stage switching-unit about the non-operational-link over a return-path of a link connecting the first-switching-unit and the previous-stage switching-unit. Those skilled in the art will realize that, if the link is a bi-directional link, the first-switching-unit can insert an indication of the link being a non-operational-link in a packet-header of a packet transmitted to the previous-stage switching-unit. Using the indication, the previous-stage switching-unit can discard packets in its VoQs that are destined for the non-operational-link. Resulting in preventing head-of-line blocking and congestion.

Figure 3:
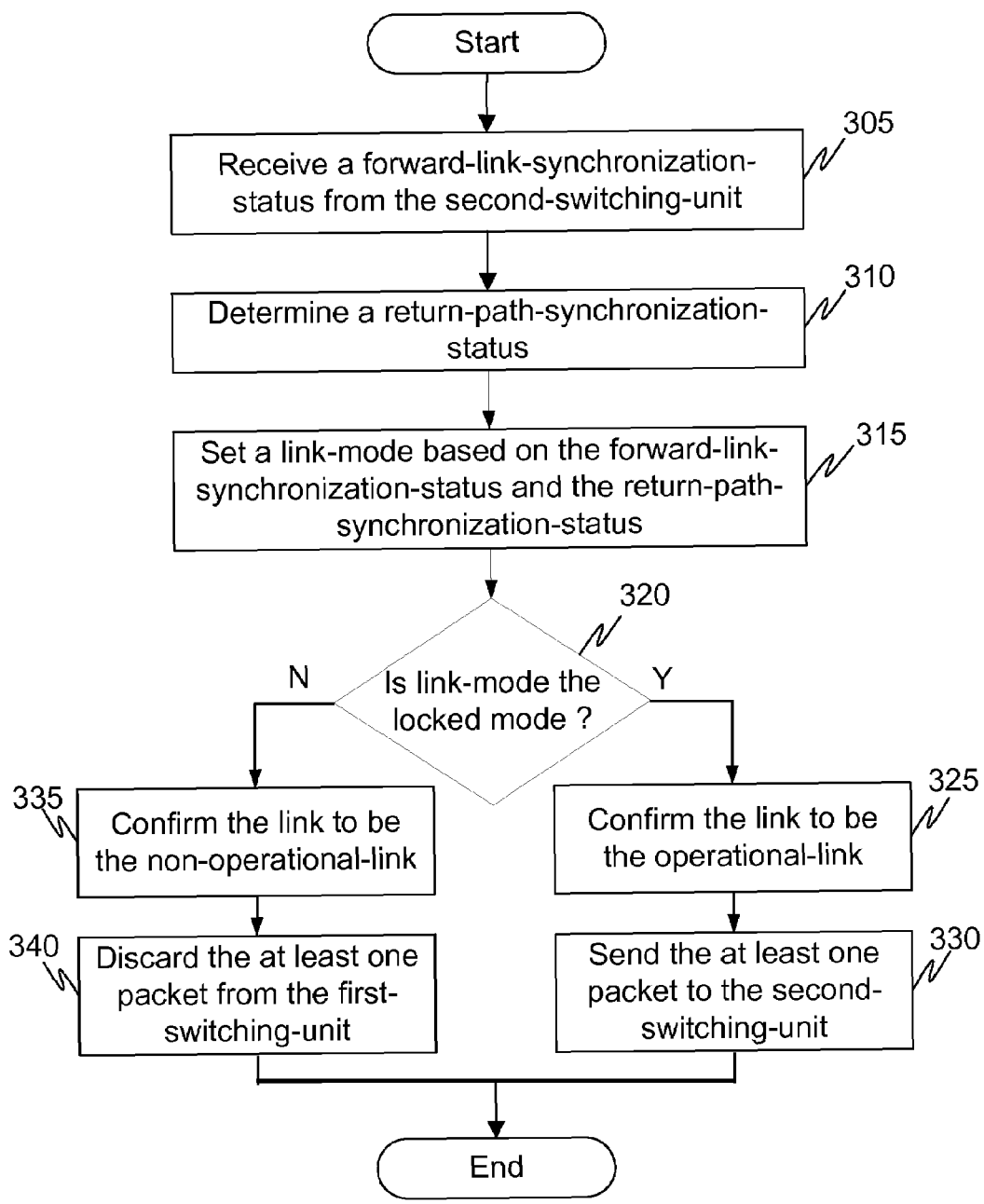
FIG. 3 illustrates a flow diagram for a method of detecting a non-operational-link in a virtual output queuing system in accordance with an embodiment of the present invention.

Turning now to FIG. 3, a flow diagram for a method of detecting a non-operational-link in a virtual output queuing system is shown in accordance with an embodiment of the present invention. A link can connect a first-switching-unit to a second-switching-unit. The first-switching-unit can be a previous-stage for the second-switching-unit and the second-switching-unit can be a next-stage for the first-switching-unit. The link can comprise a forward-link and a return-path. The forward-link enables the first-switching-unit to communicate with the second-switching-unit. Typically, packets are transmitted over the forward-link. The return-path can enable the second-switching-unit to communicate with the first-switching-unit. Typically, flow control signals are transmitted over the return-path. In an embodiment of the present invention, the link can be a bi-directional communication link. In a bi-directional communication link, packets can be transmitted over the forward-link as well as on the return-path. For example, packets can be transmitted by the first-witching-unit to the second-switching-unit over the forward-link and packets can also be received at the first-switching-unit from the second-switching-unit over the return-path.

The method of FIG. 3 enables the first-switching-unit to detect if the link is a non-operational-link or an operational-link. The link can be a non-operational-link if packets cannot be sent to the second-switching-unit by the first-switching-unit using the link. For instance a link can be a non-operational-link if the link is corrupted, if the second-switching-unit is not attached to the first-switching-unit, if the second-switching-unit cannot synchronize with the clock of the first-switching-unit or if the second switching unit is powered off. In order to detect if the link is a non-operational-link or an operational-link, a forward-link-synchronization-status is determined at the second-switching-unit. A forward-link-synchronization-status indicates if the forward-link is in a synchronized-state or an unsynchronized-state. The link can have an error-check means that provides information that the link is synchronized or not. A receiver of the second-switching-unit knows whether the forward-link is in the synchronized-state or in the unsynchronized-state. The synchronized-state can comprise an operating-frequency synchronization between the first-switching-unit and the second-switching-unit, an operating-phase synchronization between the first-switching-unit and the second-switching-unit or a word synchronization between the first-switching-unit and the second-switching-unit. On the other hand, the unsynchronized-state can comprise a hunting-state and an error-state. The hunting-state can imply that the receiver of the second-switching-unit is not synchronized with any switching-unit. Usually, a switching-unit is in the hunting-state by default on power-on. The error-state can imply that the receiver detects several transmission errors.

The first-switching-unit can receive the forward-link-synchronization-status from the second-switching-unit, at step 305. The forward-link-synchronization-status can be received on the return-path. In an embodiment of the present invention, where the link is a bi-directional communication link, the second-switching-unit can insert the forward-link-synchronization-status in a packet-header of a packet. The second-switching-unit can then send the packet to the first-switching-unit.

A return-path-synchronization-status is then determined at step 310. The return-path-synchronization-status indicates the return-path to be in one of a synchronized-state and an unsynchronized-state. The return-path can have error-check means that provides information that the return-path is in the synchronized-state or in the unsynchronized-state. As mentioned earlier, the synchronized-state can comprise an operating-frequency synchronization between the second-switching-unit and the first-switching-unit, an operating-phase synchronization between the second-switching-unit and the first-switching-unit or a word synchronization between the second-switching-unit and the first-switching-unit. On the other hand, the unsynchronized-state can comprise a hunting-state and an error-state.

The first-switching-unit then sets a link-mode corresponding to the link based on the forward-link-synchronization-status and the return-path-synchronization-status at step 315. The link-mode can be a locked mode or an un-locked mode. The link-mode is set to a locked mode if both, the forward-link and the return-path, are in the synchronized-state. The link-mode is set to an un-locked mode if at least one of the forward-link and the return-path is in the unsynchronized-state. For instance, if the forward-link is in the synchronized-state but the return-path itself is in the unsynchronized-state, the first-switching-unit may not receive the forward-link-synchronization-status on the return-path. The first-switching-unit can then set the link-mode as the un-locked mode. In another instance, the forward-link may be in the unsynchronized-state. This forward-link-synchronization-status can be sent to the first-switching-unit on the return-path. When the first-switching-unit receives the forward-link-synchronization-status on the return-path, the first-switching-unit knows that the return-path is in the synchronized-state. However, since the forward-link-synchronization-status implies that the forward-link is in the unsynchronized-state, the first-switching-unit sets the link-mode as the un-locked mode.

At step 320, if the link-mode is determined to be the locked mode, the first-switching-unit confirms the link to be an operational-link at step 325. Thus, at step 330, at least one packet can be sent to the second-switching-unit from the first-switching-unit. However, if at step 320 the link-mode is determined to be the un-locked mode, the first-switching-unit confirms the link to be a non-operational-link at step 335. Thus, at least one packet, which is destined for the link, is discarded at step 340. Discarding the packet ensures that there is no head-of-line blocking in the first-switching-unit due to the non-operational-link. Discarding a packet can comprise either dropping the packet or scheduling the packet for transmission at a later time. A method of discarding a packet is described in detail in FIG. 4

The present invention enables automatic managing of the VoQs by detecting a non-operational-link and discarding any packet destined for the non-operational-link. Therefore, the VoQs in the switching-units try to forward only those packets that have a guaranteed place in a next-stage and do not create a head-of-line blocking opportunity.

Figure 4:
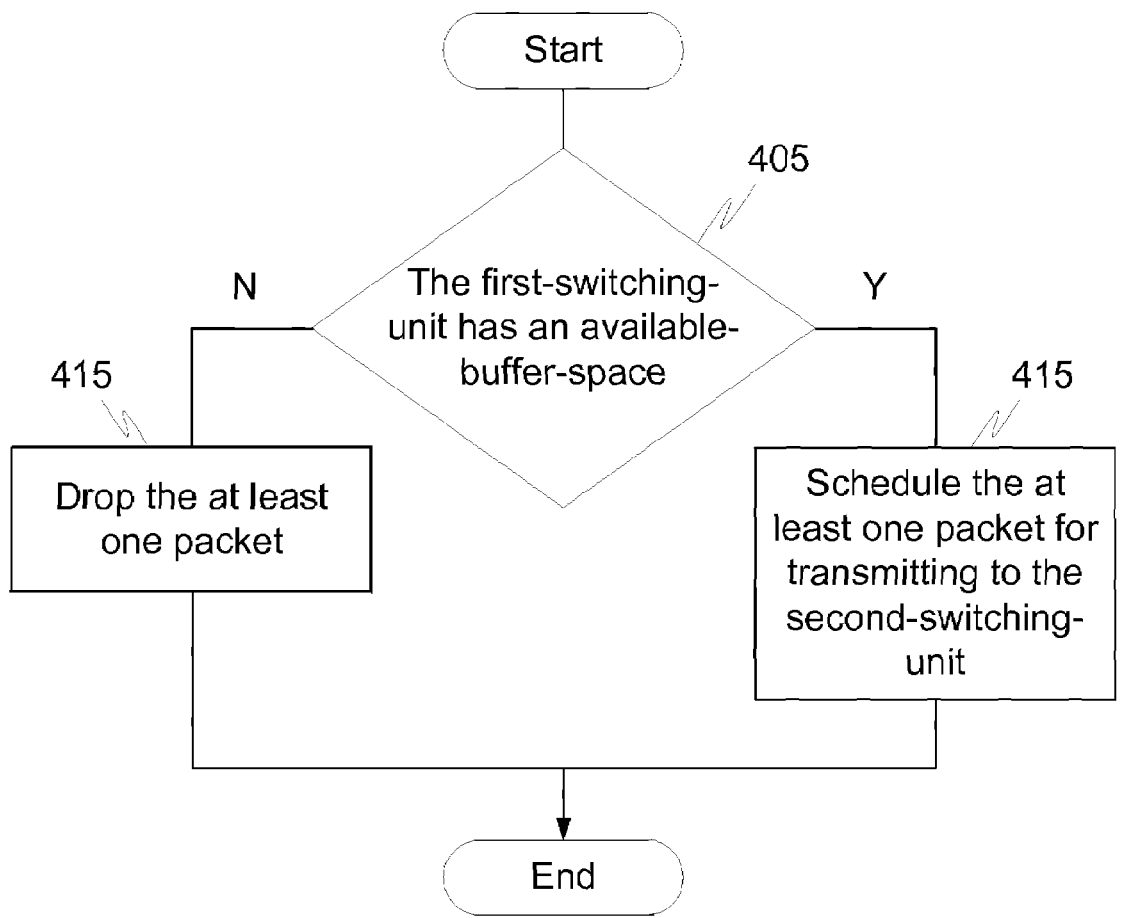
FIG. 4 illustrates a flow diagram for a method of discarding at least one packet in a virtual output queuing system in a switching fabric in accordance with an embodiment of the present invention.

Turning now to FIG. 4, a flow diagram for a method of discarding at least one packet in a virtual output queuing system in a switching fabric is shown in accordance with an embodiment of the present invention. When a link is detected to be a non-operational-link in the method of FIG. 3, one or more packets destined for the non-operational-link can be discarded so that the packets destined for the non-operational-link do not accumulate at the switching-units and cause congestion. As mentioned earlier, discarding the packet can comprise either dropping the packet or scheduling the packet for transmission at a later time.

In the method of FIG. 3, a link connecting a first-switching-unit and a second-switching-unit can be detected to be a non-operational-link. The first-switching-unit can have one or more packets destined for the non-operational-link. To decide if one or more packets destined for a non-operational-link is to be dropped or is to be scheduled for later transmission, it is determined if the first-switching-unit has an available-buffer-space, at step 405. The available-buffer-space can correspond to one or more queues in the first-switching-unit and the available-buffer-space can indicate if the one or more packets can be accommodated in the queue.

If the first-switching-unit has the available-buffer-space to accommodate one or more packets destined for the non-operational-link, the packet is not deleted from the first-switching-unit, but is scheduled to be transmitted to the second-switching-unit at step 415. Scheduling the packet can comprise placing the packet in a Retransmission Queue (RTR) so that the packet can be sent later when the link becomes an operational-link. Upon scheduling the packet, the packet can be selected for transmission to the second-switching-unit when the link becomes operational. This way, a packet is not necessarily dropped if the link that the packet is destined for is non-operational, thus, enabling an almost lossless transmission.

If the first-switching-unit does not have the available-buffer-space to accommodate one or more packets destined for the non-operational-link, the packet is dropped from the first-switching-unit at step 420. Dropping a packet can comprise deleting the packet from the VoQ.

Those skilled in the art will realize that packets destined for the non-operational-link can be discarded from any switching-unit in a packet-transfer-path corresponding to the packets. A switching-unit can receive a link-mode corresponding to the link from the first-switching-unit, the link-mode can inform the switching-unit that the link is a non-operational-link. The switching-unit can, now, either drop or schedule one or more packets destined for the non-operational-link, thus avoiding congestion at an early stage in the switching-fabric.

Those skilled in the art will realize that it is essential that packets destined for a non-operational-link are expedited through the switching fabric as quickly as possible, and that means are available to limit any build-up of VoQs in the switching fabric to the absolute minimum. Therefore, in accordance with the present invention, a switching-unit in the switching fabric tries to forward only those packets that have a guaranteed place in the next-stage and does not create any head-of-line blocking opportunity. A switching-unit, which cannot send its packets to a next-stage, may quickly cause blocking in the switching fabric.

Figure 5:
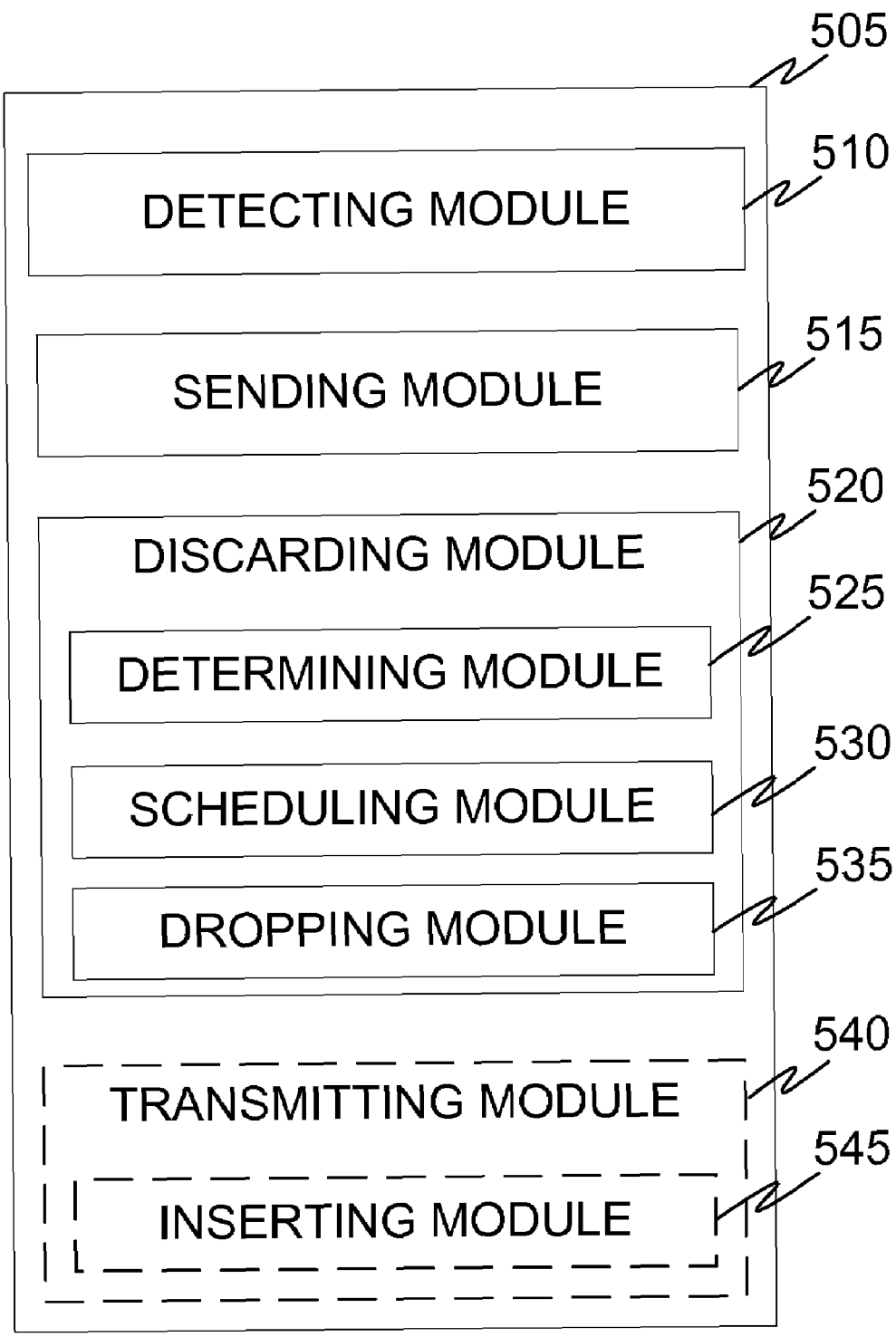
FIG. 5 illustrates a block diagram of a system for managing a virtual output queuing system in a switching fabric in accordance with an embodiment of the present invention.

Turning now to FIG. 5, a block diagram of a system for managing a virtual output queuing system in a switching fabric is shown in accordance with an embodiment of the present invention. A system 505 can reside on at least one switching-unit or on an arbiter, also known in the art as a controller, in a switching fabric. System 505 can be a software program or can be a combination of software programs and hardware components.

In a switching fabric, a link connects two switching-units, herein referred to as a first-switching-unit and a second-switching-unit. The first-switching-unit can be a switch chip, a switching adapter or a switching-output-destination port. The second-switching-unit can be a switch chip, a switching adapter or a switching-output-source port. As mentioned earlier, the link can comprise a forward-link and a return-path. Packets can be sent from the first-switching-unit to the second-switching-unit on the forward-link. Flow control signals can be sent from the second-switching-unit to the first-switching-unit on the return-path. The link can be an operational-link or a non-operational-link. The link is operational if no errors are encountered during transmissions on the link. However, the link can be non-operational if packets cannot be sent to the second-switching-unit by the first-switching-unit using the link, for example if the link is corrupted or if the second-switching-unit is not attached to the first-switching-unit. System 505, once installed on the switching fabric, can automatically detect a non-operational-link and can perform appropriate actions on at least one packet destined for the non-operational-link.

System 505 comprises a detecting module 510. Detecting module 510 is configured for detecting if a link is a non-operational-link or an operational-link. Various modules in detecting module 510 are described in detail in conjunction with FIG. 6. If the link is detected to be an operational-link, it implies that the link is functional and no transmission errors occur. A sending module 515 can send one or more packets from the first-switching-unit to the second-switching-unit if the link is an operational-link. However, if the link is a non-operational-link, then the first-switching-unit may not be able to send a packet to the second-switching-unit. This can cause congestion in the first-switching-unit. To avoid congestion, the first-switching-unit can comprise a discarding module 520. Discarding module 520 discards one or more packets destined for the non-operational-link. Thus, congestion at first-switching-unit is prevented. Moreover for a previous stage of the first-switching-unit, the packet-traffic would seem to be moving in the forward direction, and clogging at any previous stage is also prevented. This way, discarding the packet can limit any build-up of VoQs in the switching fabric to an absolute minimum.

In an embodiment of the present invention, discarding the packet can comprise either dropping the packet or scheduling the packet for transmission at a later time. Dropping the packet can comprise deleting the packet from the VoQ and scheduling the packet can comprise placing the packet in a Retransmission Queue (RTR) so that the packet can be sent later when the link becomes an operational-link.

To decide if the packet destined for a non-operational-link is to be dropped or is to be scheduled for later transmission, a determining module 525 determines if the first-switching-unit has an available-buffer-space. The available-buffer-space can correspond to at least one queue in the first-switching-unit and the available-buffer-space can indicate if the packet can be accommodated in the queue.

If determining module 525 determines that the first-switching-unit has the available-buffer-space to accommodate the packet, a scheduling unit 530 schedules the packet to be transmitted to the second-switching-unit. Scheduling the packet can comprise placing the packet in a Retransmission Queue (RTR) so that the packet can be sent later when the link becomes an operational-link. Upon scheduling the packet, the packet can be selected for transmission to the second-switching-unit when the link becomes operational. This way, a packet is not necessarily dropped if the link that the packet is destined for is non-operational, thus, enabling an almost lossless transmission.

If determining module 525 determines that the first-switching-unit does not have the available-buffer-space to accommodate one or more packets destined for the non-operational-link, a dropping module 535 drops the packet from the first-switching-unit. Dropping a packet can comprise deleting the packet from the VoQ.

Those skilled in the art will realize that packets destined for the non-operational-link can be discarded from any switching-unit in a packet-transfer-path corresponding to the packets. A switching-unit can receive a link-mode corresponding to the link from the first-switching-unit, the link-mode can inform the switching-unit that the link is a non-operational-link. The switching-unit can, now, either drop or schedule one or more packets destined for the non-operational-link, thus avoiding congestion at an early stage in the switching-fabric.

In an embodiment of the invention, the link can be a bi-directional link. For example, the packets can be transmitted from the first-switching-unit to the second-switching-unit and the packets can also be received at the first-switching-unit from the second-switching-unit on a bi-directional link. In this embodiment, system 505 can reside on the first-switching-unit. System 505 can comprise a transmitting module 540. Transmitting module 540 can transmit one or more packets to at least one switching-unit. The switching-unit can be a previous-stage switching-unit for the first-switching-unit. Transmitting module 540 can comprise an inserting module 545 for inserting the link-mode of the link in a packet-header of the packet. When the packet reached the switching-unit, the switching-unit can extract the link-mode from the packet-header. The switching-unit can now know that the link connecting the first-switching-unit and the second-switching-unit is non-operational. The switching-unit can discard any packets destined for the non-operational-link. This way, packets can be discarded at early stages in the switching fabric, thus conserving resources and making the switching fabric more efficient.

Those skilled in the art will realize that once the non-operational-link becomes an operational-link, the first-switching-unit can detect that the link-mode is now the locked mode. Discarding module 520, then, stops discarding the packets destined for the link and sending module 515 starts sending the packets to the second-switching-unit. Packets that are scheduled to be transmitted can also be transmitted in the conventional way.

Figure 6:
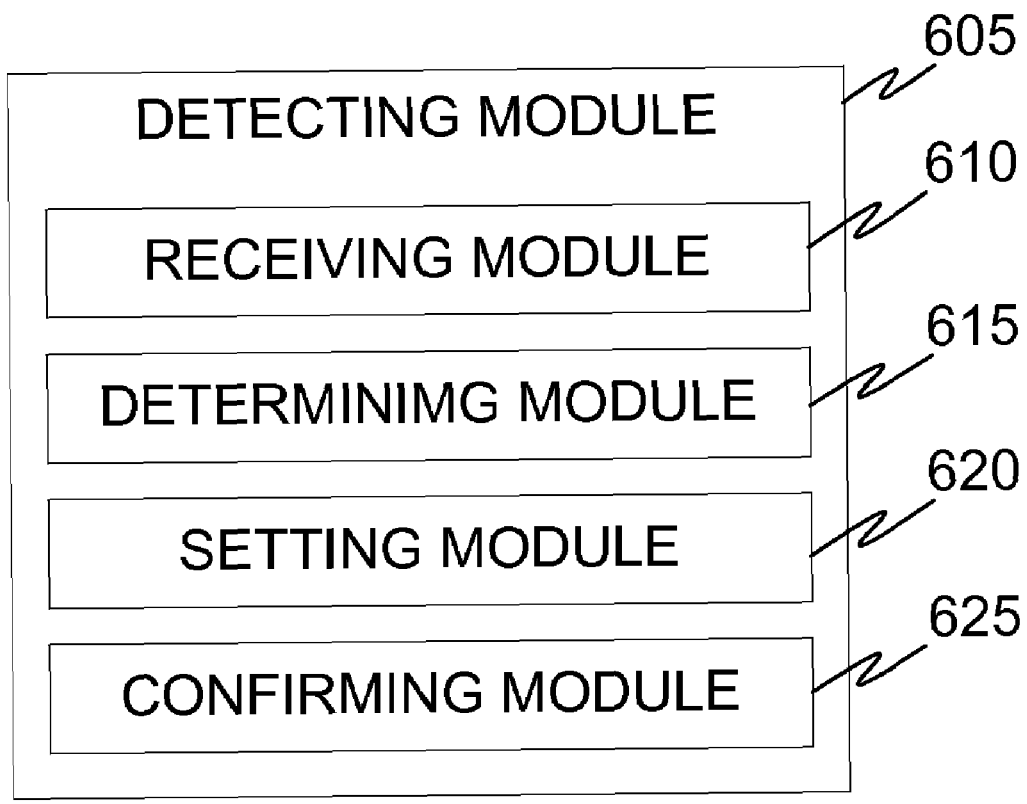
FIG. 6 illustrates a block diagram of a detecting module for detecting a non-operational link in accordance with an embodiment of the present invention.

Turning now to FIG. 6, a block diagram of a detecting module for detecting a non-operational-link is shown in accordance with an embodiment of the present invention. Detecting module 510 of FIG. 5 is represented as a detecting module 605 in FIG. 6. As mentioned in the description of FIG. 5, detecting module 605 is configured for detecting if a link is a non-operational-link or an operational-link. The link can connect a first-switching-unit to a second-switching-unit. The link can comprise a forward-link and a return-path.

Detecting module 605 comprises a receiving module 610. Receiving module 610 is adapted for receiving one or more packets from a switching-unit. The switching-unit can be a previous-stage switching-unit. The switching-unit can be a switch chip, a switch adapter or a switching-output-source port.

The packet received at receiving module 610 can be destined for a switching-output-destination port connected to the second-switching-unit. However, before transmitting the packet to the second-switching-unit, receiving module 610 receives a forward-link-synchronization-status from the second-switching-unit over the return-path. The forward-link-synchronization-status can be determined at the second-switching-unit. The forward-link-synchronization-status indicates if the forward-link is in a synchronized-state or an unsynchronized-state. A receiver of the second-switching-unit knows whether the forward-link is in the synchronized-state or in the unsynchronized-state. The synchronized-state can comprise an operating-frequency synchronization between the first-switching-unit and the second-switching-unit, an operating-phase synchronization between the first-switching-unit and the second-switching-unit or a word synchronization between the first-switching-unit and the second-switching-unit. On the other hand, the unsynchronized-state can comprise a hunting-state and an error-state. The hunting-state can imply that the receiver of the second-switching-unit is not synchronized with any switching-unit. Usually, a switching-unit is in the hunting-state by default on power-on. The error-state can imply that the receiver detects several transmission errors.

The first-switching-unit also has a determining module 615 which determines a return-path-synchronization-status of the return-path. The return-path-synchronization-status indicates the return-path to be in one of a synchronized-state and an unsynchronized-state. The return-path can have error-check means that provides information that the return-path is in the synchronized-state or in the unsynchronized-state. As mentioned earlier, the synchronized-state can comprise an operating-frequency synchronization between the second-switching-unit and the first-switching-unit, an operating-phase synchronization between the second-switching-unit and the first-switching-unit or a word synchronization between the second-switching-unit and the first-switching-unit. On the other hand, the unsynchronized-state can comprise a hunting-state and an error-state.

In an embodiment of the present invention, if receiving module 610 receives an error-free forward-synchronization-status on the return-path, it implies that the return-path is synchronized. Therefore, determining module 615 determines that the return-path is in the synchronized-state.

When detecting module 605 has both, the forward-link-synchronization-status and the return-path-synchronization-status, a setting module 620 sets a link-mode for the link. The link-mode can be a locked mode or an un-locked mode. The locked mode comprises both, the forward-link and the return-path, being in the synchronized-state. The un-locked mode comprises at least one of the forward-link and the return-path being in the unsynchronized-state. For instance, if the forward-link is in the synchronized-state but the return-path itself is in the unsynchronized-state, receiving module 610 may not receive the forward-link-synchronization-status on the return-path. Setting module 620 can then set the link-mode as the un-locked mode. In another instance, the forward-link may be in the unsynchronized-state. This forward-link-synchronization-status can be received at receiving module 610 on the return-path. Now, determining module 615 knows that the return-path is in the synchronized-state. This is because receiving module 610 receives the forward-link-synchronization-status on the return-path without any errors. However, since the forward-link-synchronization-status implies that the forward-link is in the unsynchronized-state, setting module 620 sets the link-mode as the un-locked mode. If both, the forward-link and the return-link are in the synchronized-state, setting module 620 sets the link-mode as the locked mode.

Now, based on the link-mode, a confirming module 625 confirms the link to be an operational-link or a non-operational-link. The link is confirmed to be an operational-link if the link-mode is the locked mode. This means that the forward-link and the return-link are both in the synchronized-state. However, the link is confirmed to be a non-operational-link if the link-mode is the un-locked mode. This means that at least one of the forward-link and the return-path in the unsynchronized-state.

If confirming module 625 confirms the link to be an operational-link, sending nodule 515 of FIG. 5 can send one or more packets over the link to the second-switching-unit. If confirming module 625 confirms the link to be a non-operational-link, discarding module 520 of FIG. 5 can discard one or more packets from the first-switching-unit. This way, head-of-line blocking or clogging in the switching fabric is avoided.

Additionally, it will be obvious to those skilled in the art that a detection of a connection on a previously assumed non-connected switching-output-destination port can cause a VoQ to stop discarding arriving packets immediately, thus creating a truly 'hot-plug' capability without obvious manual intervention, for example through manual switch management.

The various embodiments of the present invention provide a method and system for automatically managing a virtual output queuing system in a switching fabric. The present invention enables automatic prevention of head-of-line blocking and congestion in switching fabrics. The present invention minimizes configuration efforts, especially for large switching fabrics. The configuration effort for next stage virtual output queuing fabrics is reduced to a minimum and a real automatic operation of the switching fabric is achieved.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as critical, required, or essential features or elements of any or all the claims.

What is claimed is:
1. A method of managing a virtual output queuing system in a switching fabric, the method comprising:
 detecting if a link is one of a non-operational-link and an operational-link, the link enabling communication between a first-switching-unit comprising one of: a switch chip, a switch adapter, and a switching-output-source port, and a second-switching-unit comprising one of a switch chip, a switch adapter, and a switching-output-destination port, the link comprising a forward-link and a return-path, the forward-link enabling the first-switching-unit to communicate with the second-switching-unit and the return-path enabling the second- switching-unit to communicate with the first-switching-unit, wherein the detecting step comprises:
receiving a forward-link-synchronization-status from the second-switching-unit, the forward-link-synchronization-status indicating the forward-link to be in one of a synchronized-state and an unsynchronized-state, the forward-link-synchronization-status being determined at the second-switching-unit, the forward-link-synchronization-status being received at the first-switching-unit on the return-path;
wherein the synchronized-state comprises: at least one of an operating-frequency synchronization between the first-switching-unit and the second-switching-unit, an operating-phase synchronization between the first-switching-unit and the second- switching-unit and a word synchronization between the first-switching-unit and the second-switching-unit;
wherein the unsynchronized-state comprises one of a hunting-state and an error-state, the forward-link and the return-path being in the hunting-state by default and the forward-link and the return-path being in the error-state if at least one transmission-error is detected;
determining a return-path-synchronization-status, the return-path-synchronization-status indicating the return-path to be in one of a synchronized-state and an unsynchronized-state;
setting a link-mode based on the forward-link-synchronization-status and the return-path-synchronization-status, the link-mode corresponding to the link, the link-mode being one of a locked mode and an un-locked mode, wherein the locked mode comprises the forward-link being in the synchronized-state and the return-path being in the synchronized-state, wherein the un-locked mode comprises at least one of the forward-link and the return-path being in the unsynchronized-state; and
confirming the link to be one of the non-operational-link and the operational-link, the link being the non-operational-link if the link-mode is the un-locked mode and the link being the operational-link if the link-mode is the locked mode;
informing at least one switching-unit about the non-operational link, the at least one switching unit comprising at least one packet destined for the non-operational link, wherein at least one queue corresponding to the non-operational-link is configured as a non-operational- queue, the at least one queue belonging to the at least one switching-unit; and
discarding at least one packet, the at least one packet destined for the link, the link being the non-operational-link, wherein discarding the at least one packet comprises:
determining if the first-switching-unit has an available-buffer-space, wherein the available-buffer-space corresponds to at least one queue in the first-switching-unit, the available- buffer-space indicating if the at least one packet accommodates the at least one queue;
dropping the at least one packet, wherein the available-buffer-space is absent in the first-switching-unit; and
scheduling the at least one packet for transmitting to the second-switching-unit, the available-buffer-space is present in the first-switching-unit.

* * * * *